United States Patent
Taft et al.

(10) Patent No.: US 7,275,397 B2
(45) Date of Patent: Oct. 2, 2007

(54) METHOD OF MOLDING A SILICA ARTICLE

(75) Inventors: Terry L. Taft, Big Flats, NY (US);
Gary W. Wise, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 732 days.

(21) Appl. No.: 10/851,023

(22) Filed: May 21, 2004

(65) Prior Publication Data

US 2005/0257568 A1    Nov. 24, 2005

(51) Int. Cl.
*C03B 23/00* (2006.01)
*C03B 9/34* (2006.01)

(52) U.S. Cl. .............. 65/102; 65/43; 65/47; 65/374.13; 65/374.15

(58) Field of Classification Search .................. 65/102, 65/37, 64, 43, 47, 374.13, 374.15, 171
See application file for complete search history.

(56) References Cited

U.S. PATENT DOCUMENTS

| | | | | |
|---|---|---|---|---|
| 3,863,325 | A * | 2/1975 | Gurganus et al. | 29/423 |
| 4,358,306 | A * | 11/1982 | Okamoto et al. | 65/32.5 |
| 5,015,280 | A * | 5/1991 | Kimoto et al. | 65/307 |
| 5,080,706 | A * | 1/1992 | Snyder et al. | 65/102 |
| 5,117,306 | A * | 5/1992 | Cohen | 359/565 |
| 5,171,491 | A | 12/1992 | Kim et al. | 264/25 |
| 5,229,797 | A * | 7/1993 | Futhey et al. | 351/161 |
| 5,246,198 | A * | 9/1993 | Kurihara | 249/114.1 |
| 5,299,062 | A * | 3/1994 | Ogata | 359/571 |
| 5,552,098 | A * | 9/1996 | Kudo et al. | 264/106 |
| 5,573,566 | A | 11/1996 | Anderberg et al. | 65/102 |
| 5,715,091 | A * | 2/1998 | Meyers | 359/565 |
| 5,904,746 | A * | 5/1999 | Okada | 65/66 |
| 6,143,676 | A | 11/2000 | Ohashi et al. | 501/54 |
| 6,238,197 | B1 * | 5/2001 | Van Hout et al. | 425/168 |
| 6,410,192 | B1 | 6/2002 | Priestly et al. | 430/5 |
| 6,473,227 | B1 * | 10/2002 | Yamagata | 359/361 |
| 6,616,287 | B2 * | 9/2003 | Sekita et al. | 359/858 |
| 6,717,738 | B2 * | 4/2004 | Yamada et al. | 359/642 |
| 6,832,495 | B2 * | 12/2004 | Hosoe | 65/323 |
| 6,951,119 | B1 * | 10/2005 | Quenzer et al. | 65/102 |
| 6,994,808 | B2 * | 2/2006 | Lee et al. | 264/1.21 |
| 2002/0050152 | A1 * | 5/2002 | Fujiwara et al. | 65/32.1 |
| 2004/0194510 | A1 * | 10/2004 | Hosoe | 65/303 |
| 2005/0265685 | A1 * | 12/2005 | Ohashi et al. | 385/147 |

FOREIGN PATENT DOCUMENTS

| | | |
|---|---|---|
| JP | 56-129621 | 10/1981 |
| JP | 54-67031 | 4/1982 |
| JP | 4-54626 | 2/1992 |
| JP | 10239501 A * | 9/1998 |

* cited by examiner

*Primary Examiner*—Carlos Lopez
(74) *Attorney, Agent, or Firm*—Siwen Chen

(57) ABSTRACT

Disclosed are high temperature free-flow mold for the production of near net-shape silica articles and method for the production of near net-shape silica articles. The mold is preferably made of graphite, preferably coated with SiC on the surfaces of the mold cavity. The mold and the process use no or less refractory elastic materials than that disclosed in the prior art, and does not alter or contaminate the glass composition. The mold the process are particularly suitable for the production of high purity silica articles for use in VUV and EUV lithographic devices.

9 Claims, 4 Drawing Sheets

METHOD OF MOLDING A SILICA ARTICLE

FIELD OF THE INVENTION

The present invention relates to high-temperature molds for forming articles and method for forming molded articles. In particular, the present invention relates to high temperature molds for forming silica articles and method for forming such silica articles by using such molds. The present invention is useful, for example, in the production of near net-shape high purity silica articles having a very low OH level.

BACKGROUND OF THE INVENTION

Many applications, especially in the field of optics, require the use of high purity fused silica (HPFS®) articles having specific shapes. An example of such articles is a lens. The size of such articles may vary from very small to very large. The formation of such articles from the HPFS® material is a challenge in the art, especially for those having a large size and/or complex shape.

The HPFS® material in many applications, such as reticles and stepper lenses in modern photolithography for the production of VLI, is required very good transmission properties at short wavelength such as 248 nm, 193 nm and even shorter. In addition, the lens materials are often required of sufficient durability against excimer laser irradiation. These stringent property requirements call for tightly controlled composition of the glass.

The "direct method" for manufacturing HPFS® glass ingot typically involves the following general steps: A combustion-supporting gas, such as oxygen, and a combustible fuel gas (hydrogen, $CH_4$ or natural gas) are mixed and burned by a burner made of a synthetic silica glass. A high purity silicon containing precursor material, such as silicon chloride, silane or silicon octamethyltetrasiloxane (OM-CTS) is diluted with a carrier gas, such as $O_2$, $H_2$, inert gas, etc., and is emitted from the burner. Fine particles of a synthetic silica glass is produced by causing the precursor feedstock to react with the water (hydrolysis reaction) produced by the combustion of the surrounding oxygen gas and the fuel gas. These fine particles of synthetic silica glass are deposited on the surface of a target made of an opaque synthetic silica glass plate located beneath the burner. During the deposition, the target is subject to rotation, oscillation and downward-pulling motions. These fine particles are simultaneously melted and vitrified by the heat of the combustion of the fuel gas. If this method is used, a synthetic silica glass ingot with a relatively large diameter can be obtained.

Another method for manufacturing synthetic silica glass ingots is a so-called VAD (vapor-phase axial deposition) method, which utilizes techniques used in the manufacture of optical fibers. In this method, a porous synthetic silica glass rod is made and then consolidated by performing a heat treatment in an atmosphere, such as $Cl_2$ and/or $He/O_2$. $Cl_2$ treatment is usually used to reduce the OH level in the glass.

The synthetic silica glass ingots manufactured by these methods are cut to form glass blocks (synthetic silica glass bulks) that have a desired shape and size to be used as optical members, such as lenses, etc. However, the blocks of glasses oftentimes do not have a size large enough for the intended applications. For example, with respect to many silica glass articles requiring very low OH level, the originally supplied glass may not have the diameter for direct mechanical processing, such as machining and grinding. Thus, a small diameter billet of silica glass with the same volume has to be reflowed into a larger diameter.

The current processes for the reflow of low OH specialty HPFS® material are very complex. This is because the reflow process must not alter the glass composition in a detrimental manner. For example, care should be taken not to introduce $O_2$ molecules and/or OH into the glass during the process. This is especially difficult because the high temperature required for the reflow is oftentimes provided by oxygen burner. A current utilized process involves placing the low OH glass sandwiched between two layers of protective glass (cap glass), which could have higher OH level. The heated sandwich structure is then allowed to sag over a form so as to make a semispherical shape or other shape for further processing. This process uses oxygen fires for the addition of heat for the sagging. The cap glass protects the low OH glass from $O_2$, OH and/or other contamination during the process along with volumetric hydrostatics. This process involves secondary operations for the removal of the cap glass and then finishing the low OH glass to the final specifications.

Therefore, a direct mold casting process without the need to use the cap glass layers would be advantageous, as long as the process does not alter the glass composition in a detrimental manner.

However, casting near net-shape silica articles directly without introducing property-altering contaminants is not without difficulty. First, a very high processing temperature is required for the silica material to reach a sufficiently low viscosity. This poses great challenges to the mold design. Second, the cast near net-shape article shall have a configuration close to the end product, so that minimal post-casting finishing is required. This requires the molten glass to flow to fill the mold cavity without leaving gas pockets. Third, the cast articles shall be substantially free of defects, such as bubbles. These requirements are not easy to satisfy.

An example of the synthetic silica glass molding method is disclosed in Japanese Patent Application Kokai No. S56-129621. In that method, the silica glass bulk is molded by heat and pressure in a graphite molding vessel in a helium gas atmosphere with an absolute pressure between 0.1 Torr and the atmospheric pressure at a temperature of 1700° C. or higher. Thereafter, the molded glass is rapidly cooled to a temperature between 1100° C. and 1300° C. Furthermore, a molding method in which the graphite molding vessel has an upright structure split into two or more sections is disclosed in Japanese Patent Application Kokai No. S57-6703. A method in which molding is performed at 1600° C. to 1700° C. using a graphite molding vessel having a structure that relaxes stresses caused by the differing thermal expansion coefficients between the synthetic silica glass and the molding vessel is disclosed in Japanese Patent Application Kokuku No. H4-54626.

These processes suffer from various drawbacks. Gas bubbles are generated in the synthetic silica glass bulk during the pressing-molding at high temperatures, and these gas bubbles remain in the synthetic silica glass in large quantities after the molding. Synthetic silica glass containing such large quantities of residual gas bubbles cannot be used as optical members. In addition, at high temperatures, the synthetic silica glass bulk may react with the constituent materials of the molding vessel. For example, where graphite is used as the molding vessel, the following reaction may take place:

Because of the formation of the CO gas, undesirable recesses and projections may be formed on the surface of the glass article. As a result, near net-shape glass articles are difficult to form according to the teachings of methods in these references. Further, as a result the pressing treatment in a graphite molding vessel, the optical characteristics of the resulting synthetic silica glass member (especially the uniformity of the in-plane transmission) are often degraded. If a synthetic HPFS® glass article having such an insufficient uniformity in the in-plane transmission is incorporated in an exposure apparatus as a member, the image-focusing performance of the exposure apparatus significantly degrades, which is undesirable.

U.S. patent application Publication No. 2002/0050152 A1 discloses a method for molding a synthetic silica glass member. The method includes accommodating a synthetic silica glass bulk inside a molding vessel; interposing an elastic member having a ventilating property between a pressing member and the synthetic silica glass bulk; providing a fastener for fastening at least peripheral edge portions of the elastic member to the pressing member; and pressing the synthetic silica glass bulk against the molding vessel by the pressing member in a high-temperature condition to mold the synthetic silica glass bulk into a synthetic silica glass member having a shape conforming to a shape of the space defined by the pressing member and the molding vessel, the synthetic silica glass bulk being pressed in such a manner that the pressing member and the elastic member tightly fasten to each other through the fastener. The molding apparatus as disclosed in this reference includes a molding vessel configured to accommodate a synthetic silica glass bulk; a heater for heating the molding vessel; a pressing member that presses the synthetic silica glass bulk in a high-temperature condition against the molding vessel to mold the synthetic silica glass bulk into a synthetic silica glass member having a shape confirming to the shape of a space defined by the pressing member and the molding vessel. According to the teaching of this reference, the fused silica material is molded into the desired shape by pressing. Therefore, the glass article thus produced may have the same in-plane transmission uniformity problem as mentioned above associated with other methods disclosed in other references discussed supra. In addition, it is clear that the molds and molding process as taught in this reference cannot be used for producing articles have a complex shape. Furthermore, from the description of the mold in this reference, it is known that large amounts of elastic materials made of carbon fiber or ceramic fibers, or other refractory materials are used. These elastic members are subject to substantial tensile stress and compressive stress during the molding process, due to the mechanical force exerted by the pressing member, as well as the coefficient of thermal expansion mismatch between the molding vessel and silica glass. This calls for considerable consumption of highly refractory materials. These elastic members all have large direct contact area with the molten silica during the molding process. Migration of contaminants from the elastic member to the glass article during the casting process is a big issue for this mold. Therefore, for applications that require very high purity of the silica article, the requirements as to the purity and composition of the elastic materials are very stringent. All these factors add to the complexity and cost of the mold.

Therefore, there is a genuine need of a high temperature mold and mold casting process for the production of near net-shape articles, such as fused silica articles having complex shapes.

The present invention satisfies this need.

SUMMARY OF THE INVENTION

According to one aspect of the present invention, it is provided a high temperature near net-shape free-flow mold for the production of near net-shape silica article, comprising a detachable upper part placed over a lower part, wherein
(i) the upper part has an inner surface and an outer surface and an edge portion;
(ii) the lower part has a first surface and a second surface and an edge portion;
(iii) at least one of (a) the inner surface of the upper part and (b) the first surface of the lower part is dome-shaped;
(iv) the upper part and the lower part are engaged at the edge portions such that the inner surface of the upper part and the first surface of the lower part define a mold cavity having the shape of the near net-shape article to be manufactured;
(v) the upper part has an opening through which silica bulk material can be introduced into the mold cavity; and
(vi) at an elevated flow temperature, silica bulk placed in the mold can flow freely to fill the mold cavity to form the near net-shape article.

Preferably, at the location of the opening of the upper part of the mold mentioned above, the upper part further comprises an inlet attached to the outer surface of the upper part. The inlet can contain the molten silica material such that it will not flow on the outer surface of the upper part of the mold. The inlet of the mold of the present invention can take any shape. Preferably, the inlet is annular or rectangular in shape.

In a preferred embodiment of the mold of the present application, the upper part and the lower part are made of graphite. In a still more preferred embodiment of the present invention where the upper part and the lower part are made of graphite, the inner surface of the upper part and the first surface of the lower part are further coated with SiC.

In a preferred embodiment of the mold of the present invention, the edge portions of the upper part and the lower part are configured in a way such that when they are engaged, crevices or voids form in between the edge portions to allow passage of gas but not molten glass.

In yet another preferred embodiment of the mold of the present invention, the upper part and the lower part of the mold are engaged together with a layer of refractory elastic material. Preferably, the elastic material is made of carbon fiber or ceramic fibers.

In a preferred embodiment of the mold according to the present invention, the inner surface of the upper part is dome shaped. In another preferred embodiment of the mold according to the present invention, the first surface of the lower part is dome shaped. In a more preferred embodiment of the mold according to the present invention, both the inner surface of the upper part and the first surface of the lower part are dome shaped. In one embodiment, the inner surface of the upper part and the first surface of the lower part both arch upward. In another embodiment, the inner surface of the upper part arches upward, yet the first surface of the lower part arches downward.

According to second aspect of the present invention, it is provided a method for the production of a silica article having near net-shape, comprising the following steps:
- (A) providing a high temperature free-flow mold for the production of near net-shape silica article, comprising a detachable upper part placed over a lower part, wherein
  - (i) the upper part has an inner surface and an outer surface and an edge portion;
  - (ii) the lower part has a first surface and a second surface and an edge portion;
  - (iii) at least one of (a) the inner surface of the upper part and (b) the first surface of the lower part is dome-shaped;
  - (iv) the upper part and the lower part are engaged at the edge portions such that the inner surface of the upper part and the first surface of the lower part define a mold cavity having the shape of the near net-shape article to be manufactured;
  - (v) the upper part has an opening through which silica bulk material can be introduced into the mold cavity;
- (B) placing the mold in a way such that the upper part is located over the lower part;
- (C) introducing silica bulk material into the mold cavity via the opening of the upper part;
- (D) heating the mold and the bulk silica to a flow temperature in an inert atmosphere such that the silica bulk reaches a viscosity and flows to fill the mold cavity;
- (E) cooling the mold assembly and the silica bulk;
- (F) detaching the upper part and the lower part of the mold from the cast silica bulk at a temperature below the glass transition temperature of silica;
- (G) annealing the cast silica bulk to form the near net-shape silica article.

Preferably, in the method of the present invention, in step (A), the upper part of the mold as provided further comprises an inlet at the location of the opening attached to the outer surface of the upper part. Preferably, the inlet of the mold as provided in step (A) has an annular or rectangular shape.

In a preferred embodiment of the method of the present application for the production of a near net-shape silica article, the upper part and the lower part of the mold as provided in step (A) are made of graphite. In a still more preferred embodiment of the method of the present invention, the upper part and the lower part of the mold as provided in step (A) are made of graphite, and the inner surface of the upper part and the first surface of the lower part are further coated with SiC.

In a preferred embodiment of the method for the production of near net-shape silica article of the present invention, the edge portions of the upper part and the lower part of the mold as provided in step (A) are configured in a way such that when they are engaged, crevices or voids form in between the edge portions to allow passage of gas but not molten glass.

In yet another preferred embodiment of the method for the production of the near net-shape silica article of the present invention, the upper part and the lower part of the mold as provided in step (A) are engaged together with a refractory elastic member. Preferably, the refractive elastic member is made of carbon fiber or ceramic fibers.

Preferably, the flow temperature of step (D) of the method of the present invention is between about 1800-2000° C.

Preferably, in the method of the present invention, the silica bulk as provided in step (C) has an OH level of less than 1000 ppm, preferably less than 500 ppm, more preferably less than 300 ppm, still more preferably less than 100 ppm, most preferably less than 50 ppm. Preferably, the near net-shape article resulting from step (G) has substantially the same OH level, or a lower level than that of the silica bulk as provided in step (C).

Preferably, the near net-shape article resulting from step (G) of the method of the present invention has a birefringence level of less than about 5 nm/cm, preferably less than about 2 nm/cm.

Preferably, the near net-shape article resulting from step (G) of the method of the present invention is adapted for use in lithographic processes where UV radiation having a wavelength less than 250 nm is used, such as at 248 nm, 193 nm, 157 nm and even shorter.

The present invention is useful for high-temperature cast molding of any articles having complex near net-shape. However, the present invention is particularly advantageous for use in high temperature cast molding of near net-shape silica products that require a high purity, for use in, for example, vacuum ultraviolet lithography. Such near net-shape silica products can be used for the production of stepper lenses, reticles, and the like, with minimal surface finishing.

Representative advantages of the present invention include: (i) the mold design of the present invention is relatively simple; (ii) by using free flow of the molten glass, the resulting glass article can have a very low birefringence, and a high in-plane transmission uniformity; and (iii) the method does not require protective cap glass to insulate the bulk silica being processed, leading to fewer process steps and reduction in waste of material; (iii) contamination of the glass article is minimized; and (iv) products having very complex configurations can be produced.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

The term "near net-shape" as used herein means that the cast or molded products have a specification as cast or molded in terms of size and configuration close to the product intended for direct use, and hence little or no material needs to be removed to prepare the moldings for use.

The term "dome shaped" as used herein means that the article has a shape defined by an arching surface and an arching/planar surface. By "arching/planar," it is meant that the surface can be either an arching surface or a planar surface. The arching surface can be a truncated curved plane of any kind, such as spherical, ellipsoidal, hyperbolic, hyperboloidal, conic, and the like, and various combinations thereof.

The term "free-flow" as used herein means that that the silica material to be cast in the mold of the present invention is heated to an elevated temperature such that the viscosity thereof is sufficiently low to allow it to flow freely to fill the mold cavity due to gravitational force, without the need of additional external force or pressure.

The high temperature free-flow mold for the production of near net-shape articles of the present invention is designed for cast molding of articles at a temperature of at least 1000° C., preferably at least 1500° C., more preferably of at least 1800° C. The mold of the present invention, when produced using proper materials and used in suitable condition, may be used at a temperature up to 3000° C. However, typically, the mold will be used at lower than 2500° C., preferably lower than 2000° C. A preferred embodiment of the mold of the present invention, made by graphite, is used in the temperature range of about 1800-2000° C.

A preferred material for the production of the high temperature mold of the present invention is graphite. Graphite has been widely used in high temperature molds. Graphite is a good thermal and electrical conductor. It is not easily wetted by chemical action, which lead to good corrosion resistance. As an important structural material at high temperature, pyrolytic graphite has shown a strength of 280 MPa (40,600 psi). It tends to oxidize at high temperatures in the presence of $O_2$. However, it can be used at up to 2800° C. for a short period in neutral or reducing conditions. An advantage of graphite as mold material is its ability to be machined to various configurations. The surface of the machined mold parts can be made highly smooth. Compared to other potential mold material, graphite is also relatively less expensive. Of course, other materials, depending on the material and intended application of the molded article, may be employed as well. Such materials include, but are not limited to, high working temperature metals and metal alloys, such as Re, and other pure refractory materials such as $Al_2O_3$, MgO, $ThO_2$, $UO_2$, $ZrO_2$, spinel ($MgO.Al_2O_3$), zircon ($ZrO_2.SiO_2$) and SiC. These are high melting temperature materials. The mold parts may be surface coated to prevent reaction between the mold parts and the molten material in the mold cavity.

The mold may be used for casting articles made of any type of materials that require a high casting temperature. The mold of the present invention is particularly suitable for casting silica articles. However, it is known that graphite can react with silica at high temperature over 1800° C. The reaction can be illustrated as follows:

$$SiO_2 + C \xrightarrow[\text{Temperature}]{\text{High}} SiC + CO \uparrow$$

The CO gas generated in the reaction may prevent the molten silica glass to fill the whole mold cavity to form the near net-shape article, or may even enter into the glass to form bubbles and voids. This is highly undesirable.

A way to prevent the above reaction between the graphite mold and the molten silica is to coat the wall of the mold cavity with a corrosion resistant material. A preferred corrosion resistant coating material is silicon carbide (SiC). SiC does not react with $SiO_2$ to generate gas. As indicated above, SiC also has a very high melting temperature (3990° C.). SiC, like graphite, has a good thermal conductivity. The thermal expansion coefficient of SiC and graphite are similar as well. Therefore, a SiC coating on the mold cavity wall may last many casting cycles. SiC is relatively stable at lower temperature but may be oxidized over 1400° C. in the presence of $O_2$. Thus, to protect the graphite mold and the SiC coating from oxidation at a high molding temperature, it is desirable that the casting process is performed in neutral gas, such as $N_2$, He, Ne, Ar or other inert gas.

The SiC protective layer does not have to be very thick. For example, a dense SiC coating having a thickness of at least about 1 μm, preferably at least about 10 μm, more preferably at least about 50 μm, most preferably at least about 100 μm, may be used.

An activated slurry process can be used to form impervious silicon carbide coatings on the mold cavity of the graphite molds. An admixture of carbon, silicon carbide, produced by, for example, electrofusion of silica sand and carbon, and appropriate organic binders is formed and applied to the surfaces to be coated of the parts of the mold.

Conventional application techniques, such as dip coating, spraying, spin coating and flowing, may be used. The coating is then first treated at a lower temperature to drive off the organic binder. Subsequently, the coated surface is heated in the presence of silicon vapor at a high temperature. A SiC layer can thus be formed on the graphite surface. It is desired that the SiC layer formed on the graphite service forms a continuous network of SiC with very low impurity, such as silicon.

Another method of forming SiC coating on the mold cavity surface is by using chemical vapor deposition (CVD). Various CVD processes, including non-plasma assisted CVD, as well as plasma enhanced CVD (PECVD), may be used to form the thin SiC layer on the mold cavity surface. PECVD has been used to produce dense SiC coating on steel and metal tools. The chemical reaction in the CVD process, using $SiCl_4$ and $CH_4$ as the precursor materials, is illustrated as follows:

$$SiCl_4\ (g) + CH_4\ (g) \rightarrow SiC\ (s) + 4\ HCl\ (g)$$

The mold of the present invention has two detachable parts. For the convenience of description, the two parts are called the upper part and the lower part, respectively, according to their relative position when in use. The upper part has an outer surface and an inner surface and the lower part has a first surface and a second surface. When the upper part and the lower part are engaged, the inner surface of the upper part and the first surface of the lower part define a mold cavity that has substantially the shape of the shape of the near net-shape article to be produced. At least one of the inner surface of the upper part and the first surface of the lower part of the mold of the present invention is domed shaped. The upper part has an opening through which silica bulk material can be introduced into the mold cavity. The opening is preferably located at the center of the upper part. Preferably, an inlet is attached to the outer surface of the upper part at the location of the upper part so that molten silica material can be contained in the mold and the inlet without flowing across the outer surface of the upper part of the mold. However, it is understood that such inlet is not compulsory. Where the silica bulk melts slowly and flows sufficiently quickly into the mold cavity, and the risk of molten silica flowing across the outer surface of the upper part of the mold is low, the mold can be used without such an inlet.

Figure 1:
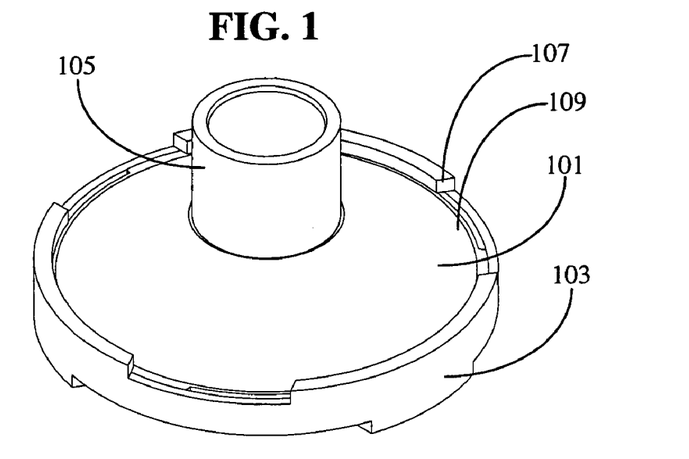
FIG. 1 is a perspective view of an embodiment of the mold according to the present invention, with an upper part and a lower part engaged at the edge portions thereof.

A perspective view of an embodiment of the mold of the present invention is illustrated in FIG. 1. In this figure, the upper part 101 and the lower part 103 are engaged at the edge portions to form an integrated mold ready for use. The edge portion 107 of the lower part 103 and the edge portion 109 of the upper part 101 have a slip-fit design. The edge portion 107 of the lower part 103 has "L" shaped protruding parts that are separated by parts without the protruding parts. The edge portion 109 of the lower portion has alternating protruding parts and recessing parts that allow the upper portion to be placed into close contact with the lower part at the edge portions. Once the upper part and the lower part are placed into contact at the edge portions, by rotating the upper part 101 relative to the lower part 103, the protruding parts of the edge portion 109 of the upper part 101 and the "L" shaped protruding parts of the edge portion 107 of the lower part 103 form a interlocked mechanism, making the assembled parts an integrated mold device. The upper part 101 has an opening in the upper center location (not shown). An inlet 105, shown as an annular pipe, is attached to the outer surface of the upper part 101 at the location of the opening. Bulk silica mater may be placed into the mold assembly via this inlet 105. The opening of the upper part can be circular, elliptical, rectangular, and any other shape. The inlet preferably has a shape substantially corresponding to the shape to the opening. For example, where the opening is circular, the inlet 105 preferably has a cylindrical shape defined by two cylindrical surfaces, with the inner cylindrical surface having a cross-section substantially identical to the opening. The opening and the inlet can alternatively take other shapes. For example, if the feedstock silica bulk material has a rectangular shape, it may be advantageous that the opening has a rectangular top view, and the inlet has a corresponding rectangular shape. The attachment of the inlet to the outer surface of the upper part of the mold is substantially free of void or gap, such that molten silica material will not flow out through the interface between the inlet and the upper part.

Figure 2:
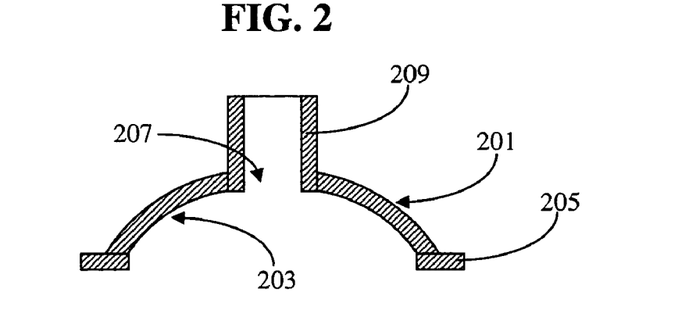
FIGS. 2 and 3 are schematic illustration of the cross-sectional view of the upper parts of two embodiments of the mold according to the present invention.
Figure 3:
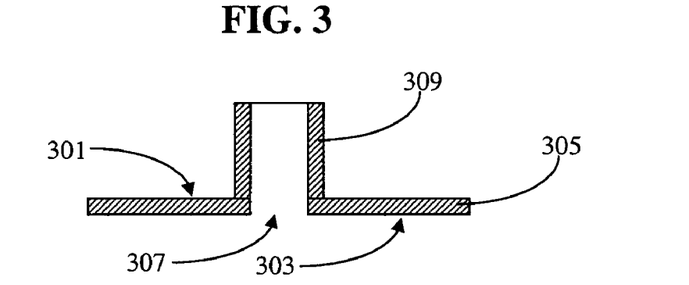

FIGS. 2 and 3 illustrate schematically the cross-sectional views (taken along a center plane of the upper part) of two embodiments of the upper part of the mold according to the present invention. In the FIG. 2 embodiment, the upper part has a dome shape. This upper part has an outer surface 201, an inner surface 203, an edge portion 205, an opening 207 at the top center of the dome, and an inlet 209 attached to the outer surface 201 at the location of the opening 207. In the FIG. 3 embodiment, the upper part has a flat shape. This upper part has a planar outer surface 301, a planar inner surface 303, and edge portion 305, a center opening 303 and an inlet 309 at the location of the opening 307 attached to the outer surface 301.

Figure 4:
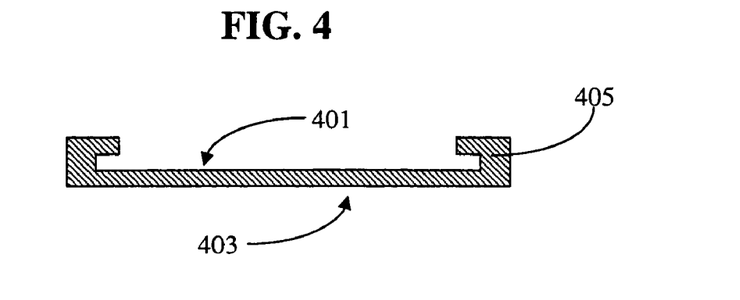
FIGS. 4-8 are schematic illustration of the cross-sectional view of the lower parts of various embodiments of the mold according to the present invention.
Figure 5:
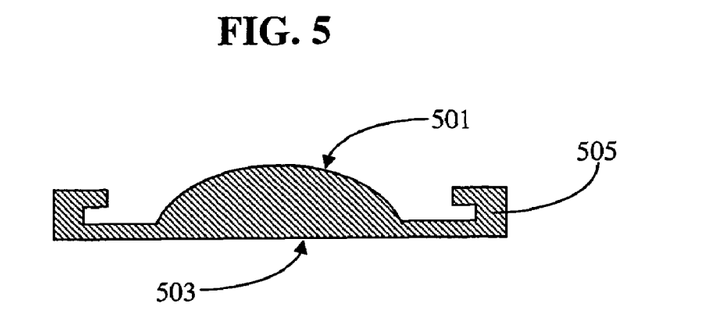
Figure 6:
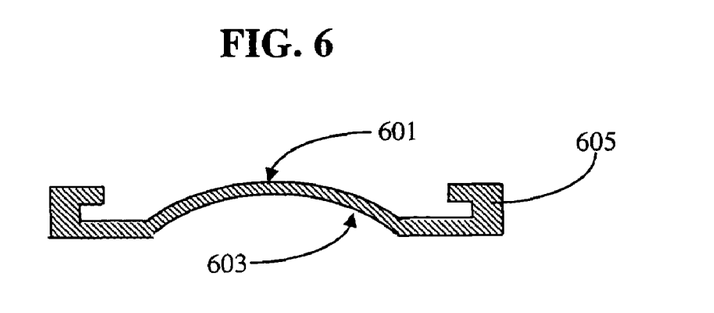
Figure 7:
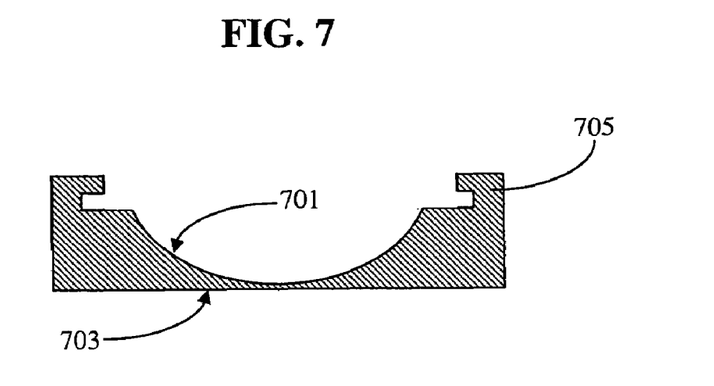
Figure 8:
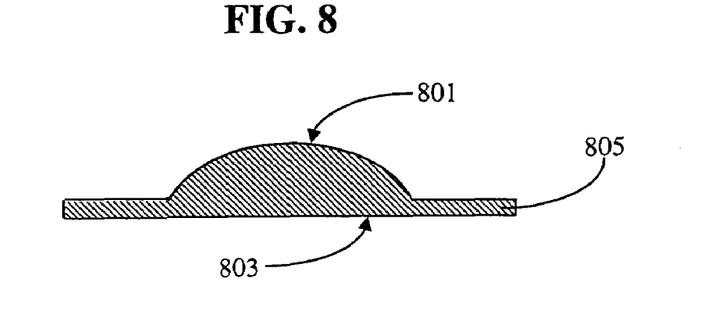

FIGS. 4-8 illustrate schematically the cross-sectional view (taken along a center plane) of several embodiments of the lower part of the mold according to the present invention. Referring to FIG. 4, the lower part has a planar first surface 401, a planar second surface 403, and an edge portion that has "L" shaped protruding parts illustrated in FIG. 1 and described supra. Referring to FIG. 5, this lower part has a dome shaped first surface 501, which arches upward, a planar second shape 503, and an edge portion that has "L" shaped protruding parts illustrated in FIG. 1 and described supra. In the embodiment of FIG. 6, the lower part has a dome shaped first surface 601, a dome shaped second surface 603, both arching upward, and an edge portion that has "L" shaped protruding parts illustrated in FIG. 1 and described supra. In the embodiment of FIG. 7, the lower part has a dome shaped first surface 701, which arches downward, a planar second surface 703, and an edge portion that has "L" shaped protruding parts illustrated in FIG. 1 and described supra. In the embodiment of FIG. 8, the lower part has a dome shaped first surface 801, which arches upward, a planar second surface 803, and an edge portion 805 that is substantially flat.

Figure 9:
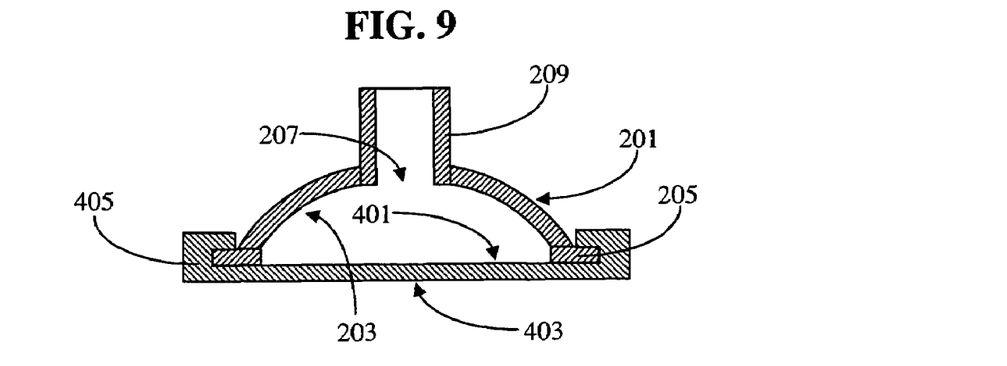
FIG. 9 is a schematic illustration of the cross-sectional view of an embodiment of the assembled mold according to the present invention, which includes an upper part as illustrated in FIG. 2 and a lower part as illustrated in FIG. 4, with the edge portions thereof engaged directly.
Figure 10:
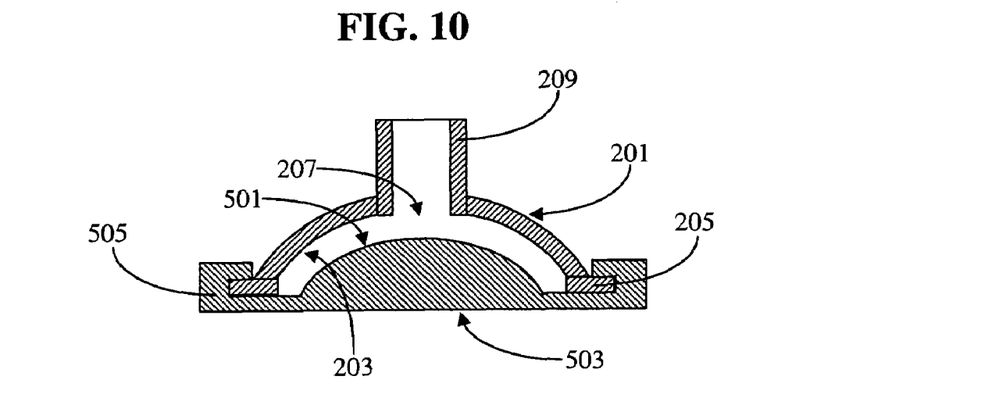
FIG. 10 is a schematic illustration of the cross-sectional view of an embodiment of the assembled mold according to the present invention, which includes an upper part as illustrated in FIG. 2 and a lower part as illustrated in FIG. 5, with the edge portions thereof engaged directly.
Figure 11:
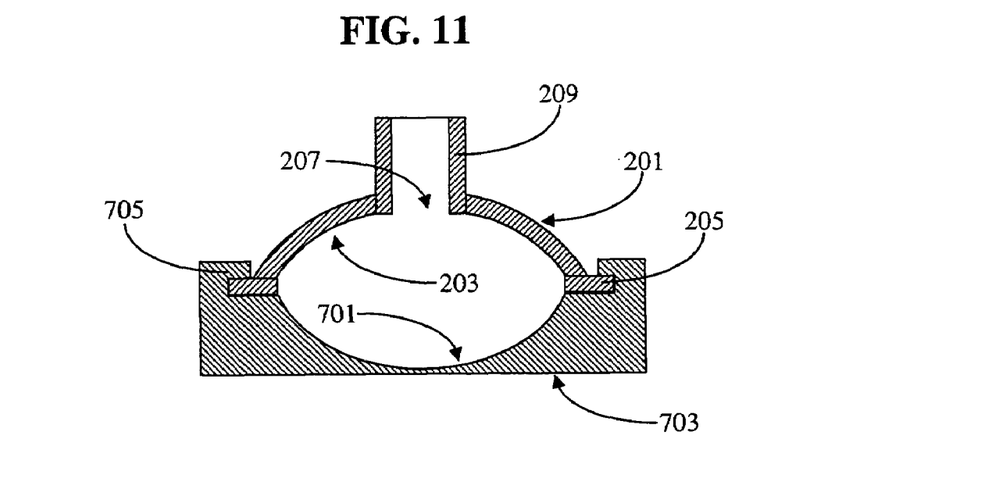
FIG. 11 is a schematic illustration of the cross-sectional view of an embodiment of the assembled mold according to the present invention, which includes an upper part as illustrated in FIG. 2 and a lower part as illustrated in FIG. 7, with the edge portions thereof engaged directly.
Figure 12:
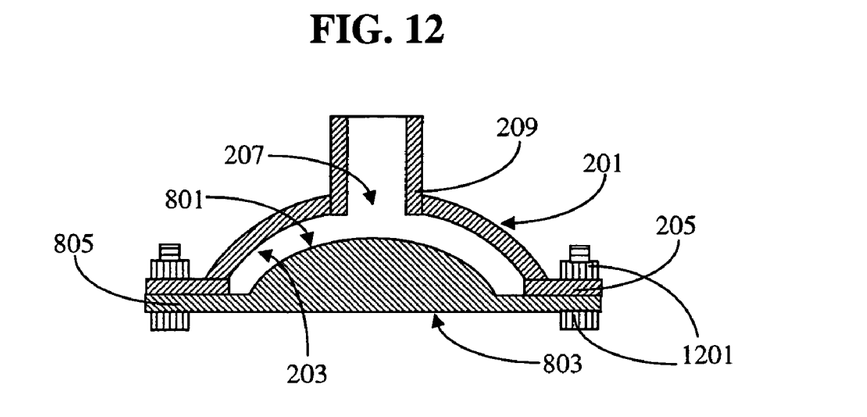
FIG. 12 is a schematic illustration of the cross-sectional view of an embodiment of the assembled mold according to the present invention, which includes an upper part as illustrated in FIG. 2 and a lower part as illustrated in FIG. 8, with the edge portions thereof engaged by using high temperature screws.

FIG. 9-12 illustrate schematically the cross-sectional view (taken along a center plane) of several embodiments of the mold of the present invention which comprises assembled upper parts and lower parts. FIG. 9 illustrates a mold comprising the upper part of FIG. 2 and a lower part of FIG. 4. FIG. 10 illustrates a mold comprising the upper part of FIG. 2 and a lower part of FIG. 5. FIG. 11 illustrates a mold comprising the upper part of FIG. 2 and a lower part of FIG. 7. In these three figures, FIGS. 9-11, the edge portions of the upper parts and the lower parts are engaged by using a slip-fit design illustrated in FIG. 1 and described supra. As can be seen, three different shapes of mold cavity are defined in these three molds. The molds of FIGS. 9-11 can be used for producing convex-planar, convex-concave, convex-convex refractive silica lens elements, respectively. FIG. 12 illustrates a mold comprising the upper part of FIG. 2 and a lower part of FIG. 8. Since both the upper part and the lower part in this mold have flat edge portions, they cannot form an interlocking mechanism such as those in FIGS. 1 and 9-11. Screws made of refractory materials are used to fasten the edge portions so that they are tightly engaged. It is preferred that, in the molds of FIGS. 9-12, the edge portions are designed such that they are engaged, e.g., via the interlocking edge design or via screw fastening, small crevices or devoid exist to allow the passage of gas but not molten glass. Though not shown in the drawings, the upper part of FIG. 2 may be used together with the lower part of FIG. 6 to form a mold, and the upper part of FIG. 3 may be used together with the lower part of FIG. 7 to form a mold.

Figure 13:
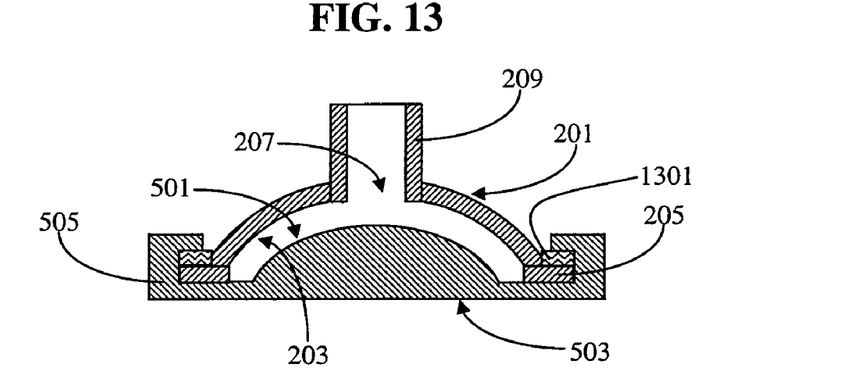
FIG. 13 is a schematic illustration of the cross-sectional view of an embodiment of the assembled mold according to the present invention, which includes an upper part as illustrated in FIG. 2 and a lower part as illustrated in FIG. 5, with the edge portions engaged having an elastic member placed therebetween.
Figure 14:
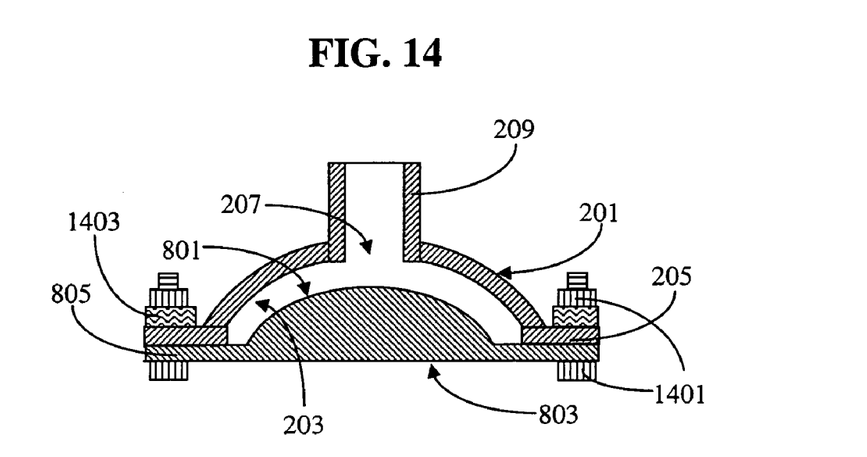
FIG. 14 is a schematic illustration of the cross-sectional view of an embodiment of the assembled mold according to the present invention, which includes an upper part as illustrated in FIG. 2 and a lower part as illustrated in FIG. 8, with the edge portions thereof engaged by using high temperature screws and with an elastic member placed between the screw and the upper part.

It is also contemplated that the edge portions of the upper part and the lower part can be engaged together with a refractory elastic member that allows slight upward movement of the upper part relative to the lower part. By "slight upward movement," it is meant that the amount of the movement is on the scale of the difference between the size of the mold cavity and the size of the near net-shape article cast in the mold cavity generated by the difference of coefficient of thermal expansion (CTE) during cooling of the mold and the molded silica article. By "engaged together with a refractory elastic member," it is meant that the elastic member can be placed in between the edge portions of the upper part and lower part, or between the edge portion of the upper/lower part and the screws if screws are used as the engaging means. It is also contemplated that multiple elastic members may be used between the edge portions of the upper part and lower part, and between the edge portions of the upper/lower part and the screws, if screws are used. It has been observed by the inventors that, when no such elastic members are used, the mismatch of CTE between silica and the mold material, especially graphite, can lead to the fracture of the mold parts during the cooling process. The elastic members can function to absorb the stress generated by the mismatch of CTE, thus help avoiding the fracture of the mold. FIGS. 13 and 14 illustrate schematically the cross-sectional views (taken along a center plane) of two embodiments of the mold of the present invention comprising refractory elastic members. In FIG. 13, a refractory elastic member 1301 is placed between the edge portion 205 of the upper part of FIG. 2 and the edge portion 505 of the lower part of FIG. 5. The refractory elastic member 1301 is placed over the edge portion 205 of the upper part. It is to be understood that an additional refractory elastic member (not shown) may be placed between the edge portions of the upper part and the lower part, but below the edge portion 205 of the upper part. The mismatch of the CTE between silica and the mold material may cause the gap between the upper part and the lower part to increase in the cooling process. An additional elastic member between the upper part and the lower part may function to prevent the molten silica to flow through the widening gap. However, such additional elastic member may not be compulsory because when the gap increases to an extent where molten glass can flow through, the glass may have already been cooled down to a high viscosity such that it will not flow through the gap. FIG. 14 illustrates a mold comprising an upper part of FIG. 2 and a lower part of FIG. 8 wherein the edge portions are engaged by using screws. A refractory elastic member 1401 is placed over the edge portion of the upper part but under the screw fastening means. Likewise, the elastic member 1401 functions to absorb the stress caused by the mismatch of CTE during cooling. Alternatively, the elastic member may be placed under the edge portion 805 of the lower part but over the screw fastening means. An additional elastic member may be placed in between the edge portion 205 of the upper part and the edge portion 805 of the lower part. As can be seen from these drawings and the above description, the amount of refractory elastic material required for the elastic member is not large, and the contact between the molten glass in the mold cavity with the elastic member can be totally avoided. In case an elastic member is employed between the edge portions of the upper part and the lower part and under the edge portion of the upper part, the contact between the molten silica glass and the elastic member is limited to a very small area. This is particularly advantageous compared to the device of U.S. patent application Publication No. 2002/0050152 A1, described supra, which requires the use of large amounts of refractory elastic material as the liner for the whole molding vessel. The mold of the present invention is thus much less expensive, and the contamination of the molten glass by the refractory elastic material can be eliminated or essentially avoided.

The refractory elastic member can be made of carbon fiber, ceramic fibers, and the like.

The mold of the present invention is good for high temperature casting of near net-shape articles. The mold of the present invention is particularly good for casting near net-shape silica products.

When molding silica products, silica bulk material is first placed into the mold through the opening of the upper part of an assembled integrated mold. Advantageously, as mentioned supra, the upper part is equipped with an inlet (sleeve). The silica bulk material may be produced by the direct method or by VAD, discussed supra. The silica bulk may take various shapes. The inlet may be required when the molding temperature is high to avoid spillage of molten silica over the outer surface of the upper part of the mold. The mold and the silica bulk are then heated to a high flow temperature. The flow temperature is preferably between about 1800-2000° C. The mold is advantageously made of graphite. Because of the possible reaction between graphite and silica at such high temperature, it is preferred the inner surface of the upper part and the first surface of the lower part, which define the mold cavity and which have direct contact with the molten silica, are coated with a SiC layer. If refractory material other than graphite is used to construct the mold parts, the inner surface of the upper part and the first surface of the lower part may be advantageously coated with a corrosion resistance coating, such as SiC, as well.

At the flow temperature, the silica bulk material softens and flows, because of the gravitational force, to displace the gas inside the mold cavity and fill the mold cavity. Subsequently, the mold and the molten silica are slowly cooled down. At a temperature lower than the glass transition temperature, the mold parts are detached from the molded glass article. Advantageously, the detached mold parts can be used for the next production cycle. The molded article is then annealed according to procedures known to one of ordinary skill in the art. The resulting silica glass article is thus near net-shape, and only minimal surface finishing is required to obtain the end product.

The high temperature molding process of the present invention using the mold of the present invention should be carried out in the presence of an inert gas, such as $N_2$, Ne, Ar or He, or combinations thereof, in order to avoid oxidation of the mold and contamination of the silica material. Thus, the mold is particularly advantageous for molding articles that require a very high purity of silica. Optical members for use in VUV and EUV less than 250 nm, such as at 248 nm, 193 nm, 157 nm and 123 nm, require the use of very high purity silica. The mold and process of the present invention can be employed to produce these optical members. Because of the non-contaminating nature of the mold and the process of the present invention, the glass composition during the process remains substantially the same. Thus, they can be used for the production of articles requiring very low OH level, for example, less than 1000 ppm, preferably less than 500 ppm, more preferably less than 300 ppm, still more preferably less than 100 ppm, still more preferably less than 50 ppm, most preferably less than 10 ppm, beginning with silica bulk material having substantially the same OH level. The process can also be used for producing near net-shape silica article having very low birefringence level, due to the free flow of the molten silica glass without the use of external pressure or force. The birefringence level can be as low as less than 5 nm/cm, measured at 632.8 nm, preferably less than 2 nm/cm. Beginning with highly homogeneous silica bulk material, silica glass article with highly homogeneous refractive index and composition can be obtained as well by using the mold and process of the present invention. Compared to the method already in use, which includes the use of cap glass, sagging and removal of the cap glass, the process of the present invention for the production of high purity silica near net-shape article has the advantage of being simple, having fewer steps, and saving materials. The size of the mold of the present invention can vary from very small to very large to suite the product need. The mold surfaces can be machined to have very complex shape to define complex mold cavity configurations.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A high-temperature molding method for the production of a silica article having near net-shape, comprising the following steps:
   (A) providing a high temperature free-flow mold for the production of near net-shape silica article, comprising a detachable upper part placed over a lower part, wherein
      (i) the upper part has an inner surface and an outer surface and an edge portion;
      (ii) the lower part has a first surface and a second surface and an edge portion;
      (iii) at least one of (a) the inner surface of the upper part and (b) the second surface of the lower part is dome-shaped;
      (iv) the upper part and the lower part are engaged at the edge portions, such that the inner surface of the upper part and the first surface of the lower part define a mold cavity having the shape of the near net-shape article to be manufactured;
      (v) the upper part has an opening that allows the introduction of silica bulk material into the mold cavity;
   (B) placing the mold in a way such that the upper part is located over the lower part;
   (C) placing silica bulk into the mold via the opening in the upper part;
   (D) heating the mold and the bulk silica to a flow temperature in an inert atmosphere such that the silica bulk reaches a viscosity and flows to fill the mold cavity;
   (E) cooling the mold assembly and the silica bulk;
   (F) detaching the upper part and the lower part of the mold from the cast silica bulk at a temperature below the glass transition temperature of silica;
   (G) annealing the cast silica bulk to form the near net-shape silica article.

2. A mold in accordance with claim 1, wherein in step (A), the upper part of the mold as provided further comprises an inlet extending upward attached to the outer surface of the upper part at the location of the opening.

3. A method in accordance with claim 1, wherein in step (A), the upper part and the lower part of the mold as provided are made of graphite.

4. A method in accordance with claim 3, wherein the inner surface of the upper part and the outer surface of the lower part of the mold as provided are coated with SiC.

5. A method in accordance with claim 1, wherein in step (A), the upper part and the lower part of the mold as provided are configured in a way such that when their edge portions are engaged, crevice or void form in between to allow passage of gas but not molten glass.

6. A method in accordance with claim 1, wherein the flow temperature in step (D) is between about 1800° C. and about 2000° C.

7. A method in accordance with claim 1, wherein the composition of the silica bulk as provided in step (D) is substantially the same as the near net-shape silica article produced in step (G).

8. A method in accordance with claim 1, wherein the near net-shape article resulting from step (G) has a birefringence level of less than 5 nm/cm, measured at 632.8 nm.

9. A method in accordance with claim 1, wherein the near net-shape article resulting from step (G) is adapted for use in lithographic processes using UV irradiation having a wavelength lower than 250 nm.

* * * * *